United States Patent
Ye et al.

(10) Patent No.: US 12,528,738 B2
(45) Date of Patent: Jan. 20, 2026

(54) GLASS FIBER SIZING AGENT FOR DAYLIGHTING PANEL AND PREPARATION METHOD AND USE THEREOF

(71) Applicant: JUSHI GROUP CO., LTD., Zhejiang (CN)

(72) Inventors: Fenglin Ye, Tongxiang (CN); Juan Liu, Tongxiang (CN); Bilong Dai, Tongxiang (CN); Hongya Zhou, Tongxiang (CN); Meng Yang, Tongxiang (CN)

(73) Assignee: JUSHI GROUP CO., LTD., Zhejiang (CN)

( * ) Notice: Subject to any disclaimer, the term of this patent is extended or adjusted under 35 U.S.C. 154(b) by 697 days.

(21) Appl. No.: 17/759,739

(22) PCT Filed: Sep. 3, 2021

(86) PCT No.: PCT/CN2021/116474
§ 371 (c)(1),
(2) Date: Jul. 29, 2022

(87) PCT Pub. No.: WO2023/000449
PCT Pub. Date: Jan. 26, 2023

(65) Prior Publication Data
US 2023/0250017 A1 Aug. 10, 2023

(30) Foreign Application Priority Data

Jul. 23, 2021 (CN) .......................... 202110834791.8

(51) Int. Cl.
*C03C 25/36* (2006.01)
(52) U.S. Cl.
CPC .................... *C03C 25/36* (2013.01)
(58) Field of Classification Search
CPC ....... C03C 25/36; C03C 25/40; C03C 25/465; C03C 25/1095; C03C 25/32; C03C 25/326; C03C 25/42; C03C 25/14; C03C 25/28; C03C 25/16; C03C 25/26; C03C 25/30; C03C 25/323; C03C 25/50; C03C 25/24; C03C 25/328; E04D 3/00; C08J 2363/00; C08J 5/08; C08K 5/5415; C08L 63/00; G10K 11/162; Y10T 428/2933; D06M 13/513; D06M 15/55; D06M 13/17; D06M 13/388; D06M 13/5135; D06M 15/21; D06M 15/507; D06M 15/564; D06M 15/647; D06M 2101/00; D06M 2101/20; D06M 13/188; D06M 13/207; D06M 13/507; D06M 15/53; D06M 15/65; D10B 2101/06; D10B 2401/062; D10B 2403/02412
See application file for complete search history.

(56) References Cited

U.S. PATENT DOCUMENTS

| | | | | |
|---|---|---|---|---|
| 4,341,877 A | * | 7/1982 | Das ........................ | C03C 25/36 523/426 |
| 2004/0258912 A1 | | 12/2004 | Piret et al. | |
| 2005/0119395 A1 | * | 6/2005 | Moireau ................. | C03C 25/26 252/8.81 |
| 2006/0257678 A1 | * | 11/2006 | Benson, Jr. .......... | G02B 5/3008 428/542.8 |
| 2014/0255631 A1 | | 9/2014 | Piret et al. | |

FOREIGN PATENT DOCUMENTS

| | | | | |
|---|---|---|---|---|
| CN | 101633567 A | | 1/2010 | |
| CN | 103889916 A | | 6/2014 | |
| CN | 106145696 A | | 11/2016 | |
| CN | 107417136 A | | 12/2017 | |
| CN | 108046615 A | | 5/2018 | |
| CN | 108249783 A | * | 7/2018 | ............. C03C 25/32 |
| CN | 108264246 A | | 7/2018 | |
| JP | 2002145889 A | * | 5/2002 | ............. C03C 25/40 |
| JP | 2012117192 A | * | 6/2012 | |
| RU | 2425852 C2 | * | 8/2011 | |

OTHER PUBLICATIONS

Machine translation of CN-108249783-A (Year: 2018).*
Machine translation of JP-2002145889-A (Year: 2002).*
Machine translation of JP-2012117192-A (Year: 2012).*
PubChem webpage for coconut oil (Year: 2025).*
Machine translation of RU-2425852-C2 (Year: 2011).*
First Office Action cited in CN202110834791.8, mailed Jan. 13, 2022, 18 pages.
International Search Report and Written Opinion cited in PCT/CN2020/123873 mailed Dec. 28, 2021, 8 pages.
European Search Report cited in EP 21921648.8, mailed Feb. 3, 2025, 10 pages.

* cited by examiner

*Primary Examiner* — Amber R Orlando
*Assistant Examiner* — Ryan Patrick Loughran
(74) *Attorney, Agent, or Firm* — Cooper Legal Group, LLC

(57) ABSTRACT

The present disclosure relates to a glass fiber sizing agent for a daylighting panel including effective components and water. The sizing agent has a solid content of 2-8%. Percentage of solid mass of each of the effective components in a solid mass of the sizing agent is as follows: a silane coupling agent: 3-15%; a film-forming agent: 68-93%; a lubricant: 0.5-10%; an antistatic agent: 1-12%; and a pH regulator: 0-5%. The present disclosure further relates to a preparation method of the glass fiber sizing agent for a daylighting panel and use of the sizing agent. Glass fiber products produced from the sizing agent of the present disclosure have a suitable stiffness and wet-out speed, and the sizing agent has an excellent refractive index. Glass fibers coated with the sizing agent can improve light transmittance of daylighting panels and strength and service life of composite materials.

10 Claims, No Drawings

GLASS FIBER SIZING AGENT FOR DAYLIGHTING PANEL AND PREPARATION METHOD AND USE THEREOF

The present disclosure is a national stage entry of International Application No. PCT/CN2021/116474, filed on Sep. 3, 2021, which claims priority to the Chinese Patent Application No. 202110834791.8, filed to the China National Intellectual Property Administration (CNIPA) on Jul. 23, 2021 and entitled "GLASS FIBER SIZING AGENT FOR DAYLIGHTING PANEL AND PREPARATION METHOD AND USE THEREOF". The entire contents of International Application No. PCT/CN2021/116474 and Chinese Patent Application No. 202110834791.8 are incorporated herein by reference.

TECHNICAL FIELD

The present disclosure relates to the technical field of glass fiber sizing agents, and in particular, to a glass fiber sizing agent for a daylighting panel and a preparation method and use thereof.

BACKGROUND

Glass fiber reinforced polyester daylighting panels have the advantages of high light transmittance, high impact strength, light weight (the specific gravity is only half of glass), excellent corrosion resistance, outstanding aging resistance, and desirable energy conservation and environmental protection. The glass fiber reinforced polyester daylighting panels are widely used in the roof lighting of buildings. With the development of green and intelligent agriculture, daylighting panels are also widely used in the construction of greenhouses for three-dimensional cultivation, scientific research seedlings, ecological restaurants, leisure sightseeing, and vegetable planting.

Glass fiber sizing agents can effectively change the surface properties and defects of glass fibers. Special sizing agents are designed for different products, to give glass fibers necessary technical properties, such as dispersibility, wet-out, stiffness, choppability, and light transmittance, thus determining the performance of glass fiber products, such as appearance uniformity, mechanical strength, and service life. At present, the glass fiber sizing agent for a daylighting panel has the following problems: The glass fiber roving produced has a stiffness of 130 mm with excellent dispersibility, but the wet-out rate exceeds 15 sec, and hence the produced daylighting panels have poor wet-out performance as well as many white fibers, resulting in 80% lower light transmittance of the produced panel; on the other hand, some glass fiber roving has a stiffness less than 115 mm and a wet-out rate less than 8 sec, but the dispersibility is very poor, and the daylighting panel produced has uneven dispersion of glass fibers, resulting in large fluctuations in the mechanical strength of fiberglass reinforced plastic (FRP) products.

SUMMARY

The present disclosure aims to provide a glass fiber sizing agent for a daylighting panel. Through the optimized design of a formula of the sizing agent, glass fibers produced not only have a refractive index similar to that of matrix resin, but also maintain a suitable stiffness and wet-out speed, improving light transmittance of the daylighting panel and strength and service life of composite materials.

To achieve the above objective, the present disclosure is implemented by the following technical solutions.

According to a first aspect of the present disclosure, a glass fiber sizing agent for a daylighting panel is provided. The sizing agent includes effective components and water, and may have a solid content of 2-8%. The effective components include a silane coupling agent, a film-forming agent, a lubricant, an antistatic agent, and a pH regulator, and percentage of solid mass of each of the effective components in a solid mass of the sizing agent may be as follows:

| silane coupling agent | 3-15% |
|---|---|
| film-forming agent | 68-93% |
| lubricant | 0.5-10% |
| antistatic agent | 1-12% |
| pH regulator | 0-5%. |

The silane coupling agent includes a first silane coupling agent and a second silane coupling agent. The first silane coupling agent is a benzylamino silane coupling agent. The second silane coupling agent is a methacryloxy silane coupling agent. The first silane coupling agent and the second silane coupling agent have a mass ratio of 1:15 to 2:3.

Preferably, the percentage of the solid mass of each of the effective components in the solid mass of the sizing agent may be as follows:

| silane coupling agent | 3-15% |
|---|---|
| film-forming agent | 72-92% |
| lubricant | 0.5-10% |
| antistatic agent | 1-12% |
| pH regulator | 0-5%. |

Preferably, the benzylamino silane coupling agent may be one or more selected from the group consisting of γ-benzyl-γ-aminoethyl-3-aminopropyltrimethoxysilane and γ-vinylbenzyl-γ-aminoethyl-3-aminopropyltrimethoxysilane. The methacryloxy silane coupling agent may be one or more selected from the group consisting of γ-methacryloxy aminopropyltriethoxysilane, γ-methacryloxypropyltrimethoxysilane, and methacryloxypropyltriethoxysilane.

Preferably, the film-forming agent may include an epoxy emulsion and an epoxy ester emulsion. The epoxy emulsion and the epoxy ester emulsion may have a solid mass ratio of 1:12 to 2:1.

Preferably, the lubricant may be one or more selected from the group consisting of coconut oil fatty acid amine, polyoxyethylene fatty acid amide, tetraethylene amylamine stearic acid condensate, lauryl diethanolamide, and dodecyl triethanolamine ammonium sulfate.

Preferably, the antistatic agent may be one or more selected from the group consisting of a dodecyl trimethyl ammonium chloride antistatic agent, an ammonium dodecylethanolamine sulfonate antistatic agent, an octadecyl dimethyl hydroxyethyl nitrate antistatic agent, a cetyltrimethyl ammonium methyl sulfate antistatic agent, a dodecyltrimethyl ammonium methyl sulfate antistatic agent, and a polyoxyethylene aliphatic amine ethyl ammonium sulfate antistatic agent.

Preferably, the pH regulator may be one or more selected from the group consisting of acetic acid, citric acid, sorbic acid, tartaric acid, lactic acid, phosphoric acid, and sulfuric acid.

Preferably, the sizing agent may have a solid content of 2.5-6%. The percentage of the solid mass of each of the effective components in the solid mass of the sizing agent may be as follows:

| silane coupling agent | 5-10% |
| film-forming agent | 73-92% |
| lubricant | 0.5-5% |
| antistatic agent | 2-8% |
| pH regulator | 0-3%. |

According to a second aspect of the present disclosure, a preparation method of the glass fiber sizing agent for a daylighting panel is provided, including:

pre-dispersing the silane coupling agent: adding an appropriate amount of water to a first container, adjusting pH to 3.0-4.0 with an appropriate amount of the pH regulator, adding the first silane coupling agent while stirring to disperse for 20-25 min, and adding the second silane coupling agent and stirring to disperse for 15-20 min;

pre-dissolving the lubricant: adding water with a mass of 10-30 times that of the lubricant and the pH regulator with a mass of 0.5-1.0 times that of the lubricant to a second container, and adding the lubricant and stirring for dissolution;

pre-dissolving the antistatic agent: adding the antistatic agent to a third container, and dissolving and diluting the antistatic agent with hot water with a mass of 15-20 times that of the antistatic agent;

pre-dissolving the film-forming agent: adding the film-forming agent to a fourth container, and dissolving the film-forming agent with water with a mass of 1-2 times that of the film-forming agent; and preparing the sizing agent: adding water with a mass of 0.2-0.3 times a total mass of the sizing agent to a preparation kettle, and adding the dispersed and dissolved silane coupling agent, film-forming agent, lubricant, and antistatic agent in sequence; and adding balance water as a supplement and stirring for even dispersion.

More specifically, the preparation method of the glass fiber sizing agent for a daylighting panel includes:

pre-dispersing the silane coupling agent: adding water with a mass of 15-45 times a total mass of the two silane coupling agents to a first container, adding the pH regulator to adjust pH to 3.0-4.0, adding the first silane coupling agent in a stirring state and stirring at 50-150 r/min for 20-25 min, slowly dropwise adding the second silane coupling agent while stirring and, once the adding of the second silane coupling agent is completed, stirring for an additional 15-20 min;

pre-dissolving and diluting the lubricant: adding the lubricant to a second container, adding 90-95° C. water with a mass of 10-30 times that of the lubricant, and adding the pH regulator with a mass of 0.5-1.0 times that of the lubricant and stirring for dissolution;

pre-dissolving and diluting the antistatic agent: adding the antistatic agent to a third container, and adding 85-95° C. water with a mass of 15-20 times that of the antistatic agent to dissolve and dilute the antistatic agent;

pre-dissolving and diluting the film-forming agent: adding the film-forming agent to a fourth container, and adding water with a mass of 1-2 times that of the film-forming agent to dissolve and dilute the film-forming agent; and preparing the sizing agent: adding water with a mass of 0.2-0.3 times a total mass of the sizing agent to a preparation kettle, and adding the dispersed silane coupling agent, and the dissolved and diluted film-forming agent, lubricant, and antistatic agent in sequence; and adding balance water as a supplement and stirring for 15-20 min.

According to a third aspect of the present disclosure, a glass fiber product produced by coating with the sizing agent, especially a glass fiber roving produced, is provided.

According to a fourth aspect of the present disclosure, use of the glass fiber product in a field of daylighting panel manufacturing is provided.

DETAILED DESCRIPTION

In order to make the objectives, technical solutions and advantages of the present disclosure clearer, the following clearly and completely describes the technical solutions in the present disclosure with reference to the examples in the present disclosure. Apparently, the described examples are some rather than all of the examples of the present disclosure. All other examples obtained by those of ordinary skill in the art based on the examples of the present disclosure without creative efforts should fall within the protection scope of the present disclosure. It should be noted that without conflict, the examples in this disclosure and features in the examples may be combined with each other.

The following is an example of the preferred value range of each component included in the glass fiber sizing agent for a daylighting panel according to the present disclosure.

Preferred Example I

A glass fiber sizing agent for a daylighting panel used by the present disclosure includes effective components and water. The sizing agent has a solid content of 2-8%. The effective components include 3-15% of a silane coupling agent, 68-93% of a film-forming agent, 0.5-10.0% of a lubricant, 1-12% of an antistatic agent, and 0-5.0% of a pH regulator.

The silane coupling agent uses a composition of a benzylamino silane coupling agent and a methacryloxy silane coupling agent. The benzylamino silane coupling agent and the methacryloxy silane coupling agent have a mass ratio of 1:15 to 2:3.

The film-forming agent is a mixture of an epoxy emulsion and an epoxy ester emulsion. The epoxy emulsion and the epoxy ester emulsion have a solid mass ratio of 1:12 to 2:1.

Preferred Example II

A glass fiber sizing agent for a daylighting panel used by the present disclosure includes effective components and water. The sizing agent has a solid content of 2-8%. The effective components include 3-15% of a silane coupling agent, 72-92% of a film-forming agent, 0.5-10% of a lubricant, 1-12% of an antistatic agent, and 0-5% of a pH regulator.

The silane coupling agent uses a composition of a benzylamino silane coupling agent and a methacryloxy silane coupling agent. The benzylamino silane coupling agent and the methacryloxy silane coupling agent have a mass ratio of 1:10 to 1:2.

The film-forming agent is a mixture of an epoxy emulsion and an epoxy ester emulsion. The epoxy emulsion and the epoxy ester emulsion have a solid mass ratio of 1:12 to 2:1.

Preferred Example III

A glass fiber sizing agent for a daylighting panel used by the present disclosure includes effective components and water. The sizing agent has a solid content of 2.5-6%. The effective components include 5-10% of a silane coupling agent, 73-92% of a film-forming agent, 0.5-5.0% of a lubricant, 2-8% of an antistatic agent, and 0-3% of a pH regulator.

The silane coupling agent uses a composition of a benzylamino silane coupling agent and a methacryloxy silane coupling agent. The benzylamino silane coupling agent and the methacryloxy silane coupling agent have a mass ratio of 1:10 to 1:2.

The film-forming agent is a mixture of an epoxy emulsion and an epoxy ester emulsion. The epoxy emulsion and the epoxy ester emulsion have a mass ratio of 1:10 to 1:1. The epoxy emulsion is one or more selected from the group consisting of a bisphenol A type epoxy emulsion, a bisphenol F type epoxy emulsion, a bisphenol AD type epoxy emulsion, a bisphenol S type epoxy emulsion, a polyphenol type epoxy emulsion, and an aliphatic glycidyl ether epoxy emulsion. The epoxy ester emulsion is one or more selected from the group consisting of a bisphenol A type epoxy acrylate emulsion, a bisphenol A type epoxy isocyanate emulsion, a bisphenol A type epoxy linoleate emulsion, and a bisphenol A type epoxy maleate emulsion.

Preferred Example IV

A glass fiber sizing agent for a daylighting panel used by the present disclosure includes effective components and water. The sizing agent has a solid content of 2-8%. The effective components include 3-15% of a silane coupling agent, 68-93% of a film-forming agent, 0.5-10.0% of a lubricant, 1-12% of an antistatic agent, and 0-5.0% of a pH regulator.

The silane coupling agent uses a composition of a benzylamino silane coupling agent and a methacryloxy silane coupling agent. The benzylamino silane coupling agent and the methacryloxy silane coupling agent have a mass ratio of 1:15 to 2:3.

The film-forming agent is a mixture of an epoxy emulsion and an epoxy ester emulsion. The epoxy emulsion and the epoxy ester emulsion have a solid mass ratio of 1:12 to 2:1. The epoxy emulsion is one or more selected from the group consisting of a bisphenol A type epoxy emulsion, a bisphenol F type epoxy emulsion, a bisphenol AD type epoxy emulsion, a bisphenol S type epoxy emulsion, a polyphenol type epoxy emulsion, and an aliphatic glycidyl ether epoxy emulsion. The epoxy ester emulsion is one or more selected from the group consisting of a bisphenol A type epoxy acrylate emulsion, a bisphenol A type epoxy isocyanate emulsion, a bisphenol A type epoxy linoleate emulsion, and a bisphenol A type epoxy maleate emulsion.

The lubricant is one or more selected from the group consisting of coconut oil fatty acid amine, tetraethylene amylamine stearic acid condensate, polyoxyethylene fatty acid amide, dodecyl triethanolamine ammonium sulfate, and lauryl diethanolamide.

The antistatic agent is one or more selected from the group consisting of a dodecyl trimethyl ammonium chloride antistatic agent, an ammonium dodecylethanolamine sulfonate antistatic agent, an octadecyl dimethyl hydroxyethyl nitrate antistatic agent, a cetyltrimethyl ammonium methyl sulfate antistatic agent, a dodecyltrimethyl ammonium methyl sulfate antistatic agent, and a polyoxyethylene aliphatic amine ethyl ammonium sulfate antistatic agent. The pH regulator is one or more selected from the group consisting of acetic acid, citric acid, sorbic acid, tartaric acid, lactic acid, phosphoric acid, and sulfuric acid. The water is deionized water.

Preparation methods of preferred examples I to IV include the following steps.

The silane coupling agent is pre-dispersed: water with a mass of 30 times a mass of the benzylamino silane coupling agent and the methacryloxy silane coupling agent is added to a first container. The pH regulator is added to adjust pH to 3.0-4.0. The benzylamino silane coupling agent is added in a stirring state and stirred at 50-150 r/min for 20-25 min. The methacryloxy silane coupling agent is slowly dropwise added, stirred while adding, and once the adding is completed, stirred for an additional 15-20 min.

The lubricant is pre-dissolved and diluted: the lubricant is added to a second container, water at 90-95° C. with a mass of 10-30 times that of the lubricant is added, and the pH regulator with a mass of 0.5-1.0 times that of the lubricant is added and stirred for dissolution.

The antistatic agent is pre-dissolved and diluted: the antistatic agent is added to a third container, and water with a mass of 15-20 times that of the antistatic agent at 85-95° C. is added to dissolve and dilute the antistatic agent.

The film-forming agent is pre-dissolved and diluted: the epoxy emulsion is added to a fourth container, and water with a mass of 1-2 times that of the epoxy emulsion is added to dissolve and dilute the epoxy emulsion. The epoxy ester emulsion is added to a fifth container, and water with a mass of 1-2 times that of the epoxy ester emulsion is added to dissolve and dilute the epoxy ester emulsion.

The sizing agent is prepared: water with a mass of 0.2-0.3 times a mass of the sizing agent is added to a preparation kettle, and a mixed solution of the dispersed benzylamino silane coupling agent and methacryloxy silane coupling agent is added. Then the diluted epoxy emulsion, epoxy ester emulsion, lubricant, and antistatic agent are added in sequence. Finally, balance water as a supplement is added, and stirring is conducted for 10-15 min.

The function and content of effective components in the glass fiber sizing agent for a daylighting panel according to the present disclosure are described as follows.

In the present disclosure, the silane coupling agent can change the bonding state of the interface between the glass fibers and the matrix resin, and greatly improve the strength and aging resistance of the composite materials. The silane coupling agent of the present disclosure is a combination of the benzylamino silane coupling agent and the methacryloxy silane coupling agent. The combination of the above two silane coupling agents can improve mechanical properties of the composite materials. In addition, the refractive index of the sizing agent is similar to that of glass, and the light transmittance is improved. The benzylamino silane coupling agent and the methacryloxy silane coupling agent have a mass ratio of 1:15 to 2:3, preferably 1:10 to 1:2. The solid mass of the silane coupling agent accounts for 3-15%, preferably 5-10%, of the solid mass of the sizing agent. A too high proportion of the silane coupling agent increases the cost, and a too low proportion affects the mechanical properties of the composite materials.

The benzylamino silane coupling agent is one or more selected from the group consisting of γ-benzyl-γ-aminoethyl-3-aminopropyltrimethoxysilane and γ-vinylbenzyl-γ-aminoethyl-3-aminopropyltrimethoxysilane. The methacryloxy silane coupling agent is one or more selected from the group consisting of γ-methacryloxy aminopropyltriethoxysilane, γ-methacryloxypropyltrimethoxysilane, and methacryloxypropyltriethoxysilane.

The film-forming agent is a main component of the glass fiber sizing agent of the present disclosure, can protect the glass fibers and improve the choppability, integrity, and compatibility with matrix resin of the glass fibers, and has a decisive impact on the continuous production and subsequent application of the glass fibers. If the content of the film-forming agent is too low, the integrity and dispersibility is poor. If the content of the film-forming agent is too high, the glass fiber strand is hard, the wet-out speed is slow, and the amount of fuzz increases. In the present disclosure, the solid mass of the film-forming agent accounts for 68-93%, preferably 72-92%, and further preferably 73-92%, of the solid mass of the sizing agent. Preferably, the film-forming agent is a mixture of the epoxy emulsion and the epoxy ester emulsion. A content ratio of the epoxy emulsion and the epoxy ester emulsion determines the wet-out speed of the glass fiber sizing agent and the stiffness of the glass fibers, and plays a decisive role in the light transmittance performance of the daylighting panel. The epoxy emulsion is an emulsion made of epoxy resin dissolved in water, and the epoxy ester emulsion is an emulsion made of epoxy ester dissolved in water. If the proportion of epoxy resin is too high, the integrity is more excellent, but the stiffness is too high, affecting the wet-out speed. If the proportion of epoxy ester is too high, the integrity is worse, affecting the dispersibility. In the present disclosure, the epoxy emulsion and the epoxy ester emulsion have a solid mass ratio of 1:12 to 2:1. Preferably, the epoxy emulsion and the epoxy ester emulsion have a solid mass ratio of 1:10 to 1:1.

Preferably, the epoxy emulsion is a bisphenol A type epoxy emulsion. The epoxy resin has a molecular weight of 1,100-7,200, and the epoxy emulsion made of the epoxy resin with that molecular weight can improve the integrity and dispersibility of the glass fibers. The epoxy emulsion has a particle size of 0.1-2.0 microns. The epoxy resin has an acetone dissolution rate greater than 85%. The epoxy resin has a glass transition temperature (Tg) of 6-45° C. The epoxy resin has an epoxy equivalent of 550-3,600 g/eq. The epoxy emulsion has a pH of 2.0-7.0. The epoxy emulsion has a viscosity of 150-3,000 mpa·s.

Preferably, the epoxy ester emulsion is a bisphenol A type epoxy ester emulsion. The epoxy ester is one or more selected from the group consisting of epoxy acrylate, epoxy isocyanate, epoxy linoleate, and epoxy maleate. More preferably, the epoxy ester is one or more selected from the group consisting of bisphenol A type epoxy acrylate, bisphenol A type epoxy isocyanate, bisphenol A type epoxy linoleate, and bisphenol A type epoxy maleate. The epoxy ester emulsion has a particle size of 0.2-1.0 microns. The epoxy ester has an epoxy equivalent of 500-2,200 g/eq. The epoxy ester can be quickly dissolved in styrene, and has an acetone dissolution rate of 100%. The epoxy resin has a Tg of 6-28° C.

Compared with other emulsions, the refractive index of the bisphenol A epoxy emulsion and the bisphenol A epoxy ester emulsion is similar to that of the matrix resin and glass, which can effectively improve the light transmittance of the daylighting panel.

The lubricant used in the present disclosure is mainly to ensure the lubricating effect of the glass fibers during fiber drawing, subsequent processing and use. If the lubricant content is too small, the lubricating effect cannot be achieved. If the lubricant content is too large, the film formation of the sizing agent on the surface of the glass fibers is affected, which ultimately affects the wet-out and compatibility of the glass fibers in the reinforced matrix resin. The lubricant of the present disclosure is preferably one or more selected from the group consisting of coconut oil fatty acid amine, tetraethylene amylamine stearic acid condensate, polyoxyethylene fatty acid amide, dodecyl triethanolamine ammonium sulfate, and lauryl diethanolamide. These lubricants have the advantages of excellent lubricity and less influence on light transmittance. The solid mass of the lubricant accounts for 0.5-10% of the solid mass of the sizing agent. Preferably, the solid mass of the lubricant accounts for 0.5-5% of the solid mass of the sizing agent. More preferably, the solid mass of the lubricant accounts for 1-4% of the solid mass of the sizing agent.

The antistatic agent of the present disclosure can be compounded well with other components in the sizing agent. The antistatic agent is preferably an organic antistatic agent. The organic antistatic agent is one or more selected from the group consisting of a dodecyl trimethyl ammonium chloride antistatic agent, an ammonium dodecylethanolamine sulfonate antistatic agent, an octadecyl dimethyl hydroxyethyl nitrate antistatic agent, a cetyltrimethyl ammonium methyl sulfate antistatic agent, a dodecyltrimethyl ammonium methyl sulfate antistatic agent, and a polyoxyethylene aliphatic amine ethyl ammonium sulfate antistatic agent.

The pH regulator of the present disclosure is used to adjust the pH of the sizing agent, so that the sizing agent can be well coated on the surface of the glass fibers. The pH regulator is preferably one or more selected from the group consisting of acetic acid, citric acid, sorbic acid, tartaric acid, lactic acid, phosphoric acid, and sulfuric acid.

The glass fibers produced by the glass fiber sizing agent for a daylighting panel of the present disclosure have the characteristics of moderate wet-out speed and good compatibility with matrix resin, and the daylighting panel produced has high light transmittance, high mechanical strength, and good weather resistance. The wet-out speed of the coated glass fibers is between 8 and 12 sec, the stiffness is between 115 and 125 mm, the bending strength of the daylighting panel is greater than 120 MPa, and the light transmittance of the daylighting pane is greater than 80%.

The refractive index of the sizing agent of the present disclosure after film formation is between 1.55 and 1.57, which is basically similar to the refractive index of the glass fibers and the reinforced matrix resin, effectively improving the light transmittance of the composite materials. The glass fiber roving produced has a stiffness of about 120 mm, a wet-out speed of 8-10 sec, and an acetone dissolution rate reaching 90%. The daylighting panel produced has less white fibers, and its light transmittance is greater than 80%.

The formulas of the glass fiber sizing agent for a daylighting panel of Examples 1 to 18 of the present disclosure are shown in Table 1.

TABLE 1

Formulas of glass fiber sizing agent for daylighting panel

| Component (%) | | Example 1 | Example 2 | Example 3 | Example 4 | Example 5 | Example 6 |
|---|---|---|---|---|---|---|---|
| Benzylamino silane coupling agent | γ-benzyl-γ-aminoethyl-3-aminopropyltrimethoxysilane | 0.46 | 0 | 1.58 | 0.62 | 1 | 3 |
| | γ-vinylbenzyl-γ-aminoethyl-3-aminopropyltrimethoxysilane | 0 | 0.46 | 0 | 0 | 0 | 0 |
| Methacryloxy silane coupling agent | γ-methacryloxy aminopropyltriethoxysilane | 0 | 0 | 8.05 | 9.3 | 0 | 0 |
| | γ-methacryloxypropyltrimethoxysilane | 4.6 | 4.6 | 0 | 0 | 2 | 4.5 |
| | Methacryloxypropyltriethoxysilane | 0 | 0 | 0 | 0 | 3 | 0 |

TABLE 1-continued

Formulas of glass fiber sizing agent for daylighting panel

| Category | Component | Ex. 1 | Ex. 2 | Ex. 3 | Ex. 4 | Ex. 5 | Ex. 6 |
|---|---|---|---|---|---|---|---|
| Epoxy emulsion | Bisphenol A type epoxy emulsion | 8.91 | 8.91 | 0 | 0 | 0 | 11.52 |
| | Bisphenol F type epoxy emulsion | 0 | 0 | 7.06 | 0 | 0 | 0 |
| | Bisphenol AD type epoxy emulsion | 0 | 0 | 0 | 44.24 | 0 | 0 |
| | Bisphenol S type epoxy emulsion | 0 | 0 | 0 | 0 | 11.52 | 0 |
| Epoxy ester emulsion | Bisphenol A type epoxy acrylate emulsion | 78.39 | 0 | 0 | 0 | 74.68 | 73.68 |
| | Bisphenol A type epoxy isocyanate emulsion | 0 | 78.29 | 0 | 0 | 0 | 0 |
| | Bisphenol A type epoxy linoleate emulsion | 0 | 0 | 76.1 | 0 | 0 | 0 |
| | Bisphenol A type epoxy maleate emulsion | 0 | 0 | 0 | 36.74 | 0 | 0 |
| Lubricant | Coconut oil fatty acid amine | 0 | 2.12 | 0 | 0 | 0 | 0 |
| | Tetraethylene amylamine stearic acid condensate | 2.12 | 0 | 0 | 0 | 0 | 3.5 |
| | Polyoxyethylene fatty acid amide | 0 | 0 | 3.15 | 0 | 0 | 0 |
| | Dodecyl triethanolamine ammonium sulfate | 0 | 0 | 0 | 3.58 | 0 | 0 |
| | Lauryl diethanolamide | 0 | 0 | 0 | 0 | 4.5 | 0 |
| Antistatic agent | Dodecyl trimethyl ammonium chloride | 0 | 5.42 | 0 | 0 | 0 | 0 |
| | Ammonium dodecylethanolamine sulfonate | 0 | 0 | 3.88 | 0 | 0 | 0 |
| | Octadecyl dimethyl hydroxyethyl nitrate | 0 | 0 | 0 | 4.52 | 0 | 0 |
| | Cetyltrimethyl ammonium methyl sulfate | 0 | 0 | 0 | 0 | 2.3 | 0 |
| | Dodecyltrimethyl ammonium methyl sulfate | 0 | 0 | 0 | 0 | 0 | 2.7 |
| | Polyoxyethylene aliphatic amine ethyl ammonium sulfate | 5.42 | 0 | 0 | 0 | 0 | 0 |
| pH regulator | Acetic acid | 0 | 0.2 | 0 | 1 | 1 | 1 |
| | Citric acid | 0.1 | 0 | 0.18 | 0 | 0 | 0.1 |
| | Solid content | 3.5 | 3.4 | 4.2 | 4.5 | 4.5 | 4.8 |

| Category | Component (%) | Example 7 | Example 8 | Example 9 | Example 10 | Example 11 | Example 12 |
|---|---|---|---|---|---|---|---|
| Benzylamino silane coupling agent | γ-benzyl-γ-aminoethyl-3-aminopropyltrimethoxysilane | 2.4 | 2.4 | 2.5 | 3 | 3.5 | 3.5 |
| | γ-vinylbenzyl-γ-aminoethyl-3-aminopropyltrimethoxysilane | 0 | 0 | 0 | 0 | 0 | 0 |
| Methacryloxy silane coupling agent | γ-methacryloxy aminopropyltriethoxysilane | 0 | 0 | 5.5 | 5 | 0 | 0 |
| | γ-methacryloxypropyltrimethoxysilane | 7.4 | 7.4 | 0 | 0 | 0 | 0 |
| | Methacryloxypropyltriethoxysilane | 0 | 0 | 0 | 0 | 5.2 | 5.3 |
| Epoxy emulsion | Bisphenol A type epoxy emulsion | 41.1 | 0 | 39.5 | 39.5 | 15.3 | 17.3 |
| | Bisphenol F type epoxy emulsion | 0 | 41.1 | 0 | 0 | 0 | 0 |
| | Bisphenol AD type epoxy emulsion | 0 | 0 | 0 | 0 | 0 | 0 |
| | Bisphenol S type epoxy emulsion | 0 | 0 | 0 | 0 | 0 | 0 |
| Epoxy ester emulsion | Bisphenol A type epoxy acrylate emulsion | 41.1 | 0 | 42.4 | 42.4 | 62.4 | 0 |
| | Bisphenol A type epoxy isocyanate emulsion | 0 | 0 | 0 | 0 | 0 | 0 |
| | Bisphenol A type epoxy linoleate emulsion | 0 | 0 | 0 | 0 | 0 | 0 |
| | Bisphenol A type epoxy maleate emulsion | 0 | 41.1 | 0 | 0 | 0 | 60.3 |
| Lubricant | Coconut oil fatty acid amine | 0 | 0 | 0.6 | 0 | 0 | 0 |
| | Tetraethylene amylamine stearic acid condensate | 4.5 | 0 | 0 | 0 | 0 | 0 |
| | Polyoxyethylene fatty acid amide | 0 | 4.5 | 0 | 0 | 3.8 | 3.8 |
| | Dodecyl triethanolamine ammonium sulfate | 0 | 0 | 0 | 0.6 | 0 | 0 |
| | Lauryl diethanolamide | 0 | 0 | 0 | 0 | 0 | 0 |
| Antistatic agent | Dodecyl trimethyl ammonium chloride | 0 | 2.8 | 0 | 0 | 0 | 0 |
| | Ammonium dodecylethanolamine sulfonate | 2.8 | 0 | 0 | 8 | 0 | 0 |
| | Octadecyl dimethyl | 0 | 0 | 8 | 0 | 0 | 0 |

TABLE 1-continued

Formulas of glass fiber sizing agent for daylighting panel

|  |  |  |  |  |  |  |  |
|---|---|---|---|---|---|---|---|
|  | hydroxyethyl nitrate |  |  |  |  |  |  |
|  | Cetyltrimethyl ammonium methyl sulfate | 0 | 0 | 0 | 0 | 0 | 0 |
|  | Dodecyltrimethyl ammonium methyl sulfate | 0 | 0 | 0 | 0 | 0 | 0 |
|  | Polyoxyethylene aliphatic amine ethyl ammonium sulfate | 0 | 0 | 0 | 0 | 9 | 9 |
| pH regulator | Acetic acid | 0 | 0 | 0 | 0 | 0 | 0 |
|  | Citric Acid | 0.7 | 0.7 | 1.5 | 1.5 | 0.8 | 0.8 |
|  | Solid content | 5 | 5 | 5.2 | 5.2 | 4.1 | 4.1 |

|  | Component (%) | Example 13 | Example 14 | Example 15 | Example 16 | Example 17 | Example 18 |
|---|---|---|---|---|---|---|---|
| Benzylamino silane coupling agent | γ-benzyl-γ-aminoethyl-3-aminopropyltrimethoxysilane | 0 | 0 | 1.5 | 0 | 2.5 | 2.5 |
|  | γ-vinylbenzyl-γ-aminoethyl-3-aminopropyltrimethoxysilane | 2.4 | 2.4 | 0 | 1.8 | 0 | 0 |
| Methacryloxy silane coupling agent | γ-methacryloxy aminopropyltriethoxysilane | 0 | 0 | 3 | 2.7 | 0 | 0 |
|  | γ-methacryloxypropyltrimethoxysilane | 5 | 5 | 0 | 0 | 7.5 | 7.5 |
|  | Methacryloxypropyltriethoxysilane | 0 | 0 | 0 | 0 | 0 | 0 |
| Epoxy emulsion | Bisphenol A type epoxy emulsion | 42 | 0 | 50 | 50 | 60.1 | 60.1 |
|  | Bisphenol F type epoxy emulsion | 0 | 42 | 0 | 0 | 0 | 0 |
|  | Bisphenol AD type epoxy emulsion | 0 | 0 | 0 | 0 | 0 | 0 |
|  | Bisphenol S type epoxy emulsion | 0 | 0 | 0 | 0 | 0 | 0 |
| Epoxy ester emulsion | Bisphenol A type epoxy acrylate emulsion | 42 | 0 | 35 | 35 | 15.1 | 0 |
|  | Bisphenol A type epoxy isocyanate emulsion | 0 | 0 | 0 | 0 | 0 | 0 |
|  | Bisphenol A type epoxy linoleate emulsion | 0 | 0 | 0 | 0 | 0 | 0 |
|  | Bisphenol A type epoxy maleate emulsion | 0 | 42 | 0 | 0 | 0 | 15.1 |
| Lubricant | Coconut oil fatty acid amine | 0 | 0 | 0.6 | 0 | 0 | 0 |
|  | Tetraethylene amylamine stearic acid condensate | 4.5 | 0 | 0 | 0 | 0 | 0 |
|  | Polyoxyethylene fatty acid amide | 0 | 4.5 | 0 | 0 | 5 | 5 |
|  | Dodecyl triethanolamine ammonium sulfate | 0 | 0 | 0 | 0.6 | 0 | 0 |
|  | Lauryl diethanolamide | 0 | 0 | 0 | 0 | 0 | 0 |
| Antistatic agent | Dodecyl trimethyl ammonium chloride | 0 | 3.4 | 0 | 0 | 0 | 0 |
|  | Ammonium dodecylethanolamine sulfonate | 3.4 | 0 | 0 | 8.4 | 0 | 0 |
|  | Octadecyl dimethyl hydroxyethyl nitrate | 0 | 0 | 8.4 | 0 | 0 | 0 |
|  | Cetyltrimethyl ammonium methyl sulfate | 0 | 0 | 0 | 0 | 0 | 0 |
|  | Dodecyltrimethyl ammonium methyl sulfate | 0 | 0 | 0 | 0 | 0 | 0 |
|  | Polyoxyethylene aliphatic amine ethyl ammonium sulfate | 0 | 0 | 0 | 0 | 9 | 9 |
| pH regulator | Acetic acid | 0 | 0 | 0 | 0 | 0 | 0 |
|  | Citric Acid | 0.7 | 0.7 | 1.5 | 1.5 | 0.8 | 0.8 |
|  | Solid content | 3.4 | 3.4 | 5.2 | 5.2 | 5.8 | 5.8 |

Preparation methods of Examples 1 to 18 were as follows.

The silane coupling agent was pre-dispersed: water with a mass of 30 times a mass of the benzylamino silane coupling agent and the methacryloxy silane coupling agent was added to a first container. The pH regulator was added to adjust pH to 3.0-4.0. The benzylamino silane coupling agent was added in a stirring state and stirred at 50-150 r/min for 20-25 min. The methacryloxy silane coupling agent was slowly dropwise added, stirred while adding, and once the adding is completed, stirred for an additional 15-20 min.

The lubricant was pre-dissolved and diluted: the lubricant was added to a second container, water at 90-95° C. with a mass of 10-30 times that of the lubricant was added, and acetic acid with a mass of 0.5-1.0 times that of the lubricant was added and stirred for dissolution.

The antistatic agent was pre-dissolved and diluted: the antistatic agent was added to a third container, and water with a mass of 15-20 times that of the antistatic agent at 85-95° C. was added to dissolve and dilute the antistatic agent.

The film-forming agent was pre-dissolved and diluted: the epoxy emulsion was added to a fourth container, and water with a mass of 1-2 times that of the epoxy emulsion was added to dissolve and dilute the epoxy emulsion. The epoxy ester emulsion was added to a fifth container, and water with a mass of 1-2 times that of the epoxy ester emulsion was added to dissolve and dilute the epoxy ester emulsion.

The sizing agent was prepared: water with a mass of 0.2-0.3 times a mass of the sizing agent was added to a preparation kettle, and a mixed solution of the pre-dispersed benzylamino silane coupling agent and methacryloxy silane coupling agent was added. Then the pre-dissolved and diluted epoxy emulsion, epoxy ester emulsion, lubricant, and antistatic agent were added in sequence. Finally, balance water as a supplement was added, and stirring was conducted for 10-15 min.

In order to further illustrate the beneficial effects of the present disclosure, three commonly used glass fiber sizing agents (Comparative Examples 1 to 3) are selected as comparative examples. The formulas of Comparative Examples 1 to 3 are shown in Table 2.

TABLE 2

Formula of Comparative Examples 1 to 3

| Component | Comparative Example 1 | Comparative Example 2 | Comparative Example 3 |
|---|---|---|---|
| Coupling agent A | 0.40 | 0.40 | 0.40 |
| Coupling agent B | 0.20 | / | 0.20 |
| Lubricant A | 0.30 | 0.30 | 0.30 |
| Lubricant B | 0.10 | 0.03 | 0.10 |
| Inorganic antistatic agent | 0.20 | 0.20 | 0.20 |
| Organic antistatic agent | 0.20 | 0.20 | 0.20 |
| Film-forming agent A | 3.00 | / | 3.00 |
| Film-forming agent B | 7.00 | / | / |
| Film-forming agent C | / | 7.00 | 5.00 |
| pH regulator | 0.30 | 0.03 | 0.30 |
| Solid content (%) | 4.8 | 4.5 | 4.2 |

The coupling agent A is γ-methacryloxy aminopropyltriethoxysilane with a model of A-174. The coupling agent B is cationic benzylsilane with a model of 1161. The lubricant A is fatty acid amide with a model of 88710. The lubricant B is PEG400MS. The organic antistatic agent is ammonium methyl sulfate with a model of DSM A05620. The inorganic antistatic agent is $LiNO_3$. The film-forming agent A is a polyvinyl acetate emulsion with a model of N33. The film-forming agent B is an epoxy emulsion with a model of TX-209. The film-forming agent C is an unsaturated polyester emulsion with a model of JS-111. The pH regulator is acetic acid.

A 3600-hole platinum bushing is used for fiber drawing in the examples of the present disclosure and in the comparative examples. Each bundle of strand comprises 100 monofilaments, and a monofilament has a diameter of about 12 microns. The drying process adopts hot air drying which is conducted for a period of 12 h. The linear density of the final product is 2400 tex.

Table 3 shows the performance test results of the glass fiber products produced with the sizing agents in Examples 1 to 18 and Comparative Examples 1 to 3. In order to ensure the comparability of the test results, in the process of sample preparation, it has been ensured that the combustible content of the glass fibers prepared in the examples and comparative examples is basically the same, that is, in the examples and the comparative examples, the percentage of the solid mass of the sizing agent coated on the surface of the glass fiber in the mass of the glass fiber is basically the same. In addition, it has been ensured that the glass fibers prepared in the examples and comparative examples have the same polyester resin type and temperature required for wet-out and daylighting panel samples, so as to compare the properties of the glass fibers.

TABLE 3

Performance test results of glass fibers produced by coating with sizing agents in examples and comparative examples

| Test item | Example 1 | Example 2 | Example 3 | Example 4 | Example 5 | Example 6 | Example 7 | Example 8 | Example 9 | Example 10 |
|---|---|---|---|---|---|---|---|---|---|---|
| Combustible content (%) GB/T9914.2 2013 | 0.51 | 0.50 | 0.55 | 0.35 | 0.41 | 0.50 | 0.55 | 0.61 | 0.55 | 0.61 |
| Wet-out speed (sec) GB/T 17470 | 8 | 9 | 8 | 13 | 8 | 9 | 8 | 13 | 8 | 13 |
| Acetone dissolution rate (%) GB/T 26734 | 89.2 | 85.6 | 87.3 | 88.2 | 89.6 | 89.7 | 87.3 | 86.3 | 87.3 | 89.5 |
| Stiffness (mm) GB/T 7690.4 | 120 | 121 | 125 | 128 | 120 | 121 | 125 | 128 | 125 | 128 |
| Light transmittance (%) GB/T 5433 | 84.7 | 80.3 | 80.2 | 83.1 | 84.7 | 81.3 | 80.6 | 80.8 | 84.6 | 83.1 |
| Tensile strength (MPa) GBT 1447 | 90.5 | 91.2 | 95 | 92.1 | 91.5 | 92.1 | 95 | 96.3 | 95 | 97.4 |
| Bending strength (MPa) GB T 1449-2005 | 125 | 126.3 | 135 | 128.3 | 125.4 | 126.2 | 129 | 130.3 | 135 | 136.3 |
| Glass fiber content (%) GB T 2577-2005 | 21.1 | 21.3 | 20.9 | 20.8 | 21.1 | 21.3 | 20.9 | 20.8 | 20.9 | 20.8 |

TABLE 3-continued

Performance test results of glass fibers produced by coating with sizing agents in examples and comparative examples

| Test item | Example 11 | Example 12 | Example 13 | Example 14 | Example 15 | Example 16 | Example 17 | Example 18 | Comparative Example 1 | Comparative Example 2 | Comparative Example 3 |
|---|---|---|---|---|---|---|---|---|---|---|---|
| Combustible content (%) GB/T9914.2 2013 | 0.55 | 0.61 | 0.55 | 0.61 | 0.55 | 0.61 | 0.68 | 0.71 | 0.67 | 0.65 | 0.66 |
| Wet-out speed (sec) GB/T 17470 | 8 | 13 | 8 | 10 | 8 | 13 | 13 | 14 | 18 | 5 | 21 |
| Acetone dissolution rate (%) GB/T 26734 | 88.3 | 90.1 | 87.3 | 86 | 87.3 | 88.5 | 87.3 | 87.2 | 82.5 | 81.2 | 82.1 |
| Stiffness (mm) GB/T 7690.4 | 125 | 128 | 125 | 128 | 125 | 128 | 127 | 128 | 134 | 102 | 137 |
| Light transmittance (%) GB/T 5433 | 80.6 | 83.1 | 80.6 | 80.1 | 80.6 | 83.1 | 81.6 | 82.1 | 76.8 | 78.4 | 71.3 |
| Tensile strength (Mpa) GBT 1447 | 96 | 92.1 | 90 | 91.1 | 9 | 92.1 | 93 | 92.1 | 85.6 | 81.7 | 87.9 |
| Bending strength (MPa) GB T 1449-2005 | 135 | 128.3 | 121 | 122.3 | 123 | 122.3 | 125 | 128.3 | 118 | 108 | 117 |
| Glass fiber content (%) GB T 2577-2005 | 20.9 | 20.8 | 20.9 | 20.8 | 20.9 | 20.8 | 20.9 | 20.8 | 20.1 | 19.8 | 20.4 |

Remarks: Combustible content = $\dfrac{\text{Solid mass of agent coated on surface of glass fibers}}{\text{Mass of glass fibers}} \times 100\%$ From the test results in Table 3, it can be seen that the glass fiber roving produced by coating with the sizing agent of the present disclosure has a stiffness of 120-128 mm, a relatively moderate wet-out speed of 8-14 sec, and an acetone dissolution rate greater than 85%, which can reach even 90%. The daylighting panel produced has less white fibers, the light transmittance is greater than 80%, and less fuzz occurs in the production and use process. The glass fibers produced by coating with the sizing agent in the comparative examples have low light transmittance and too high or too low wet-out speed, which cannot meet the actual production needs. Therefore, compared with the prior art, the present disclosure has the advantages of suitable stiffness and wet-out speed, high light transmittance of the daylighting panel, high strength and long service life of the composite materials.

It should be noted that the dosage of each effective component in the present disclosure is expressed in a percentage of the solid mass of the effective component in the solid mass of the sizing agent. In the present disclosure, the four steps of pre-dispersing the silane coupling agent, pre-dissolving the lubricant, pre-dissolving the antistatic agent, and pre-dissolving the film-forming agent are not limited to a fixed order, and the four steps can be conducted simultaneously or in any order. The terms such as "first container", "second container", "third container", "fourth container", etc. are only for clearer explanation of the present disclosure, rather than limitation of the present disclosure.

It should be noted that terms "including", "comprising", or any other variants thereof are intended to cover non-exclusive inclusion, such that a process, method, article, or device including a series of elements includes not only those elements but also other elements not explicitly listed, or elements inherent to such a process, method, article, or device. In case there are no more restrictions, an element limited by such statement as "including a . . . " does not exclude the presence of additional identical elements in the process, the method, the article, or the device that includes the element.

The above examples are only used for describing the technical solutions of the present disclosure, and are not intended to limit the present disclosure. Although the present disclosure is described in detail with reference to the foregoing examples, those of ordinary skill in the art should understand that they can still modify the technical solutions described in the foregoing examples, or make equivalent substitutions on some technical features therein. These modifications or substitutions do not make the essence of the corresponding technical solutions deviate from the spirit and scope of the technical solutions of the examples of the present disclosure.

INDUSTRIAL APPLICABILITY

According to the glass fiber sizing agent for a daylighting panel provided by the present disclosure, through the optimized design of a formula of the sizing agent, the glass fibers produced have moderate wet-out speed, good compatibility with matrix resin, and the daylighting panel produced has high light transmittance, high mechanical strength, and excellent weather resistance. The glass fibers produced not only has a refractive index similar to that of the matrix resin, but also maintains a suitable stiffness and wet-out speed, improving the light transmittance of the daylighting panel and the strength and service life of the composite materials.

The invention claimed is:

1. A glass fiber sizing agent for a daylighting panel, wherein the glass fiber sizing agent comprises effective components and water, and has a solid content of 2-8%; and the effective components comprise a silane coupling agent, a film-forming agent, a lubricant, an antistatic agent, and a pH regulator, and a percentage of solid mass of each of the effective components in a solid mass of the glass fiber sizing agent is as follows:

| the silane coupling agent | 3-15%, |
|---|---|
| the film-forming agent | 68-93%, |
| the lubricant | 0.5-10%, |
| the antistatic agent | 1-12%, and |
| the pH regulator | 0-5%; | the silane coupling agent comprises a first silane coupling agent and a second silane coupling agent, the first silane coupling agent is a benzylamino silane coupling agent, the second silane coupling agent is a methacryloxy silane coupling agent, and the first silane coupling agent and the second silane coupling agent have a mass ratio of 1:15 to 2:3;
the benzylamino silane coupling agent is one or more selected from the group consisting of γ-benzyl-γ-aminoethyl-3-aminopropyltrimethoxysilane and γ-vinylbenzyl-γ-aminoethyl-3-aminopropyltrimethoxysilane;
the film-forming agent comprises an epoxy emulsion and an epoxy ester emulsion; and the epoxy emulsion and the epoxy ester emulsion have a solid mass ratio of 1:12 to 2:1; and
the epoxy ester emulsion is one or more selected from the group consisting of a bisphenol A type epoxy acrylate emulsion, a bisphenol A type epoxy isocyanate emulsion, a bisphenol A type epoxy linoleate emulsion, and a bisphenol A type epoxy maleate emulsion.

2. The glass fiber sizing agent according to claim 1, wherein the percentage of the solid mass of each of the effective components in the solid mass of the glass fiber sizing agent is as follows:

| the silane coupling agent | 3-15%, |
|---|---|
| the film-forming agent | 72-92%, |
| the lubricant | 0.5-10%, |
| the antistatic agent | 1-12%, and |
| the pH regulator | 0-5%. |

3. The glass fiber sizing agent according to claim 1, wherein the solid content of the glass fiber sizing agent is 2.5-6%; and the percentage of the solid mass of each of the effective components in the solid mass of the glass fiber sizing agent is as follows:

| the silane coupling agent | 5-10%, |
|---|---|
| the film-forming agent | 73-92%, |
| the lubricant | 0.5-5%, |
| the antistatic agent | 2-8%, and |
| the pH regulator | 0-3%. |

4. The glass fiber sizing agent according to claim 1, wherein the methacryloxy silane coupling agent is one or more selected from the group consisting of γ-methacryloxy aminopropyltriethoxysilane, γ-methacryloxypropyltrimethoxysilane, and methacryloxypropyltriethoxysilane.

5. The glass fiber sizing agent according to claim 1, wherein the epoxy emulsion is one or more selected from the group consisting of a bisphenol A type epoxy emulsion, a bisphenol F type epoxy emulsion, a bisphenol AD type epoxy emulsion, a bisphenol S type epoxy emulsion, a polyphenol type epoxy emulsion, and an aliphatic glycidyl ether epoxy emulsion.

6. The glass fiber sizing agent according to claim 1, wherein the lubricant is one or more selected from the group consisting of coconut oil fatty acid amine, polyoxyethylene fatty acid amide, tetraethylene amylamine stearic acid condensate, lauryl diethanolamide, and dodecyl triethanolamine ammonium sulfate.

7. The glass fiber sizing agent according to claim 1, wherein the antistatic agent is one or more selected from the group consisting of a dodecyl trimethyl ammonium chloride antistatic agent, an ammonium dodecylethanolamine sulfonate antistatic agent, an octadecyl dimethyl hydroxyethyl nitrate antistatic agent, a cetyltrimethyl ammonium methyl sulfate antistatic agent, a dodecyltrimethyl ammonium methyl sulfate antistatic agent, and a polyoxyethylene aliphatic amine ethyl ammonium sulfate antistatic agent.

8. The glass fiber sizing agent according to claim 1, wherein the pH regulator is one or more selected from the group consisting of acetic acid, citric acid, sorbic acid, tartaric acid, lactic acid, phosphoric acid, and sulfuric acid.

9. A preparation method of a glass fiber sizing agent, comprising:
pre-dispersing a silane coupling agent by adding an amount of water to a first container, adjusting pH to 3.0-4.0 with an amount of a pH regulator, adding a first silane coupling agent while stirring to disperse for 20-25 min, and adding a second silane coupling agent and stirring to disperse for 15-20 min;
pre-dissolving a lubricant by adding hot water with a mass of 10-30 times that of the lubricant and the pH regulator with a mass of 0.5-1.0 times that of the lubricant to a second container, and adding the lubricant and stirring for dissolution;
pre-dissolving an antistatic agent by adding the antistatic agent to a third container, and dissolving and diluting the antistatic agent with hot water with a mass of 15-20 times that of the antistatic agent;
pre-dissolving a film-forming agent by adding the film-forming agent to a fourth container, and dissolving the film-forming agent with water with a mass of 1-2 times that of the film-forming agent; and
preparing the glass fiber sizing agent by adding water with a mass of 0.2-0.3 times a total mass of the glass fiber sizing agent to a preparation kettle, and adding the dispersed and dissolved silane coupling agent, the film-forming agent, the lubricant, and the antistatic agent in sequence; and adding balance water as a supplement and stirring for even dispersion;
wherein the glass fiber sizing agent comprises effective components and water, and has a solid content of 2-8%; and the effective components comprise the silane coupling agent, the film-forming agent, the lubricant, the antistatic agent, and the pH regulator, and a percentage of solid mass of each of the effective components in a solid mass of the glass fiber sizing agent is as follows:

| the silane coupling agent | 3-15%, |
|---|---|
| the film-forming agent | 68-93%, |
| the lubricant | 0.5-10%, |
| the antistatic agent | 1-12%, and |
| the pH regulator | 0-5%; | the silane coupling agent comprises the first silane coupling agent and the second silane coupling agent, the first silane coupling agent is a benzylamino silane coupling agent, the second silane coupling agent is a methacryloxy silane coupling agent, and the first silane coupling agent and the second silane coupling agent have a mass ratio of 1:15 to 2:3;

the benzylamino silane coupling agent is one or more selected from the group consisting of γ-benzyl-γ-aminoethyl-3-aminopropyltrimethoxysilane and γ-vinylbenzyl-γ-aminoethyl-3-aminopropyltrimethoxysilane;

the film-forming agent comprises an epoxy emulsion and an epoxy ester emulsion; and the epoxy emulsion and the epoxy ester emulsion have a solid mass ratio of 1:12 to 2:1; and the epoxy ester emulsion is one or more selected from the group consisting of a bisphenol A type epoxy acrylate emulsion, a bisphenol A type epoxy isocyanate emulsion, a bisphenol A type epoxy linoleate emulsion, and a bisphenol A type epoxy maleate emulsion.

10. A glass fiber product produced by coating with a glass fiber sizing agent, wherein the glass fiber sizing agent comprises effective components and water, and has a solid content of 2-8%; and the effective components comprise a silane coupling agent, a film-forming agent, a lubricant, an antistatic agent, and a pH regulator, and a percentage of solid mass of each of the effective components in a solid mass of the glass fiber sizing agent is as follows:

| | |
|---|---|
| the silane coupling agent | 3-15%, |
| the film-forming agent | 68-93%, |
| the lubricant | 0.5-10%, |
| the antistatic agent | 1-12%, and |
| the pH regulator | 0-5%; | the silane coupling agent comprises a first silane coupling agent and a second silane coupling agent, the first silane coupling agent is a benzylamino silane coupling agent, the second silane coupling agent is a methacryloxy silane coupling agent, and the first silane coupling agent and the second silane coupling agent have a mass ratio of 1:15 to 2:3;

the benzylamino silane coupling agent is one or more selected from the group consisting of γ-benzyl-γ-aminoethyl-3-aminopropyltrimethoxysilane and γ-vinylbenzyl-γ-aminoethyl-3-aminopropyltrimethoxysilane;

the film-forming agent comprises an epoxy emulsion and an epoxy ester emulsion; and the epoxy emulsion and the epoxy ester emulsion have a solid mass ratio of 1:12 to 2:1; and the epoxy ester emulsion is one or more selected from the group consisting of a bisphenol A type epoxy acrylate emulsion, a bisphenol A type epoxy isocyanate emulsion, a bisphenol A type epoxy linoleate emulsion, and a bisphenol A type epoxy maleate emulsion.

* * * * *